May 4, 1948.  F. F. EHRENHAFT  2,441,013
CINEMATOGRAPHIC ROTATABLE PRISM PROJECTOR
Filed July 20, 1945  3 Sheets-Sheet 1

INVENTOR.
Franz F. Ehrenhaft
BY

May 4, 1948. F. F. EHRENHAFT 2,441,013
CINEMATOGRAPHIC ROTATABLE PRISM PROJECTOR
Filed July 20, 1945 3 Sheets-Sheet 3

INVENTOR.
BY Franz F. Ehrenhaft

Patented May 4, 1948

2,441,013

UNITED STATES PATENT OFFICE 2,441,013

CINEMATOGRAPHIC ROTATABLE PRISM PROJECTOR

Franz F. Ehrenhaft, Forest Hills, N. Y.

Application July 20, 1945, Serial No. 606,187

2 Claims. (Cl. 88—16.8)

My present invention relates to continuous motion picture projectors and more particularly to motion picture projectors used for television purposes.

In projectors of the above type, it is of great importance to keep the speed of the film uniform and to synchronize the movement of the compensating member, e. g., rotation of the compensating prism, with the film movement. This means that during operation of the projector the speed of the moving film and the rotating prism have to be kept uniform and constant and in a certain predetermined relation to each other.

Any inaccuracy, particularly difference between the movement of the film and the compensating member, i. e., lack of synchronization, would result in unsteadiness of the images projected on the projection screen and make use of such projectors for television purposes impossible.

In television systems, particularly in systems comprising scanning devices without storage effect, it is advisable to use projectors in which polygonal refraction prisms are used as rectifying elements for compensation of the continuous film movement. Such prisms have to rotate with uniform speed and in perfect synchronism with the movement of the film. Even the elasticity of the film has such an effect upon proper synchronization that it is necessary to avoid formation of loops in the film strip during projection; otherwise, if no special precautions are taken, such loops would interfere with proper synchronization of the movement of the film through the film gate and the rotation of the refraction prism used as rectifier.

It is therefore an object of my present invention to provide a continuous motion picture projector constructed in such a manner as to obtain steady images on the projection screen.

It is another object of this invention to avoid as far as possible formation of loops in the film during movement of the same through the projector.

More particularly, it is a further object of my present invention to construct continuous motion picture projectors in which the compensating prism is rotated by the film itself in such a manner that the film does not form any loops between the film gate and the sprocket engaging the film and serving for rotating the prism.

Still another object of my present invention consists in using a specific type of optical reflecting systems for motion picture projectors of the type described above.

Still a further object of my present invention consists in providing special means by which it is possible to eliminate variations in the light intensity of the projected images.

With the above objects in view, my new cinematographic projector includes as main elements in combination a light source emitting a projecting light beam, a film gate arranged in the path of this light beam and adapted to guide a film during movement of the same through this film gate, a sprocket arranged in the plane in which the film is moving through the film gate in such a manner as to engage the film after the same has moved through this film gate, a compensating prism arranged co-axially with this sprocket, means carrying both this sprocket and this compensating prism rotatably about a common axis which is normal to the above mentioned plane of movement of the film through the film gate, and combined light reflecting means arranged in the path of the projecting light beam after the same has passed through the film gate; these combined light reflecting means are constructed and arranged in such a manner as to reflect the light beam through the compensating prism mentioned above, preferably in a plane parallel to the plane of movement of the film through the film gate.

I have found that good results are obtainable with cinematographic projectors constructed as defined in the preceding paragraph. However, these results can be greatly improved by spacing the axis of rotation of the means, e. g., shaft carrying the sprocket and the compensating prism from the path of the light beam passing through the film gate, preferably in such a manner that the sprocket is located as near as possible to the film gate, i. e., adjacent to the same.

In this manner, it is possible to reduce the film length between the film gate and the sprocket which is driving and rotating the compensating prism, thus avoiding formation of loops between gate and sprocket and increasing uniformity and synchronization between the movement of the film through the gate and the rotation of the prism.

In an arrangement of this specific type, however, it is advisable to reflect the light beam after it has passed through the film gate several times, namely so that it passes through the compensating prism not only normal to the axis of rotation of the shaft carrying this prism and the sprocket, but also normal to the path of the light beam passing through the film gate. Actually, it is necessary to reflect the light beam no less than three times; therefore I prefer to use for these purposes a so-called Porro prism of the second type. Such a prism may be regarded as a combination of three right angle prisms fused together in such a manner that the first two of these right angle prisms shift the axis of the light beam parallelly and the third of these right angle prisms erects the axis of the reflected light beam perpendicularly to the plane of shifting obtained by the first two prisms.

As already mentioned above, I have found it advantageous to rotate the compensating prism by the film itself. Thus, the film has to be driven and transported. For this purpose, I preferably use a transporting sprocket engaging the film after the same has engaged the sprocket driving, i. e., rotating the prism. Thus, rotation of the transporting sprocket will result in movement of the film through the film gate and rotation of the sprocket driving the prism.

In some cases, it is difficult to arrange the prism driving sprocket immediately adjacent to the film gate. In such cases, I have found it advisable to provide a film roller between the gate and the prism driving sprocket. This film roller is then arranged as near as possible to the film gate and the prism driving sprocket so as to avoid formation of film loops between this roller and the gate on the one hand and the roller and the sprocket on the other hand. I have also found it advisable to arrange this film roller adjustably, for instance in the way described in my prior Patent No. 2,298,045, "Optical compensating devices," issued October 6, 1942.

It is evident that the smaller the prism driving sprocket, the nearer it can be arranged to the film gate and the shorter will be the length of film between this gate and the first sprocket tooth engaging the film. Therefore, I have found it advisable to use in a projector of the type proposed herewith a prism driving sprocket of relatively small size. However, since the size of this sprocket determines the size of the prism driven by it and the number of plane parallel faces of such a prism, reduction of the size of the sprocket will result in reduction of the size of the prism and of the number of plane parallel prism faces, i. e., it becomes necessary to use prisms having relatively few pairs of plane parallel faces. This, in turn, might in some cases result in flicker of the projected images. Since, as well known, in projectors of this type the flicker effect is the stronger the smaller the prism, i. e., the fewer faces the prism has.

In order to avoid this disadvantage and in accordance with a preferred embodiment of my present invention, I have found it advisable to arrange in projectors of the type proposed by me—if the projectors are to be used for purposes where even slight flicker of the projected images has to be avoided—a movable equalizer member having portions of different light transparency adapted to equalize light variations and avoid flicker of the projected images; an equalizer member of this type is preferably arranged between the light source and the film gate in the path of the light beam and means are provided for moving, e. g., rotating or oscillating, this equalizer member in synchronism with the movement of the film through the film gate.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
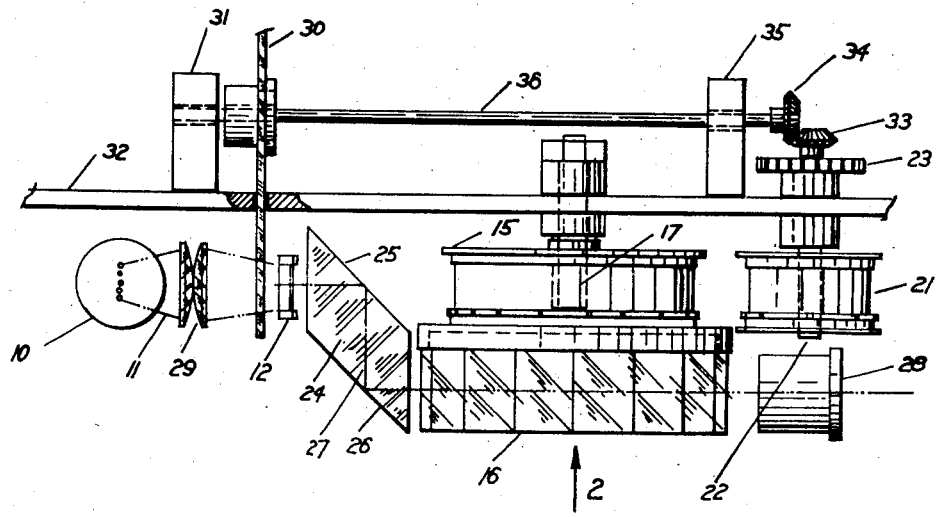
Fig. 1 is a top view of a cinematographic projector according to my present invention.
Figure 2:
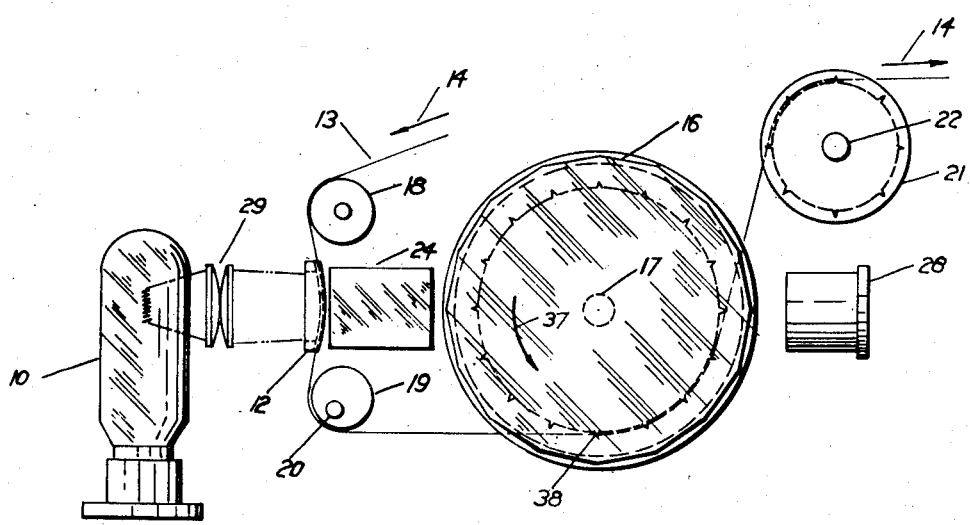
Fig. 2 is a front view of the cinematographic projector shown in Fig. 1, seen in direction of arrow 2 of Fig. 1.

The cinematographic projector shown in Figs. 1 and 2 comprises a light source 10 emitting a projecting light beam 11 passing through the film gate 12 arranged in the path of this light beam. This film gate 12 serves for guiding the film 13 moving through the film gate in direction of arrow 14 as indicated in Fig. 2.

The prism driving sprocket 15 is arranged in the plane of movement of film 13 as shown in Fig. 1. The compensating prism 16 is arranged co-axially with this sprocket 15. Both sprocket 15 and prism 16 are carried by shaft 17 freely rotatably about a rotating axis arranged normal to the plane of movement of film 13. In the projector shown in Figs. 1 and 2, this axis of rotation also intersects the path of light beam 11.

Near the two ends of the gate 12, I arrange two freely rotatable rollers 18 and 19. The first of these rollers, namely, roller 18, is rotatable about a stationary axis, while roller 19 is turnable about an eccentric pin 20 enabling adjustment of the position of the axis of rotation of this roller for purposes described below in detail.

The transporting sprocket 21 engages film 13 after the same has engaged the prism driving sprocket 15. This transporting sprocket 21 is carried by shaft 22 and driven by means of the gear 23. This gear 23 in turn is driven by an electric motor or other driving means, not shown in the drawing.

In order to direct the light beam 11, after the same has passed through the film moving past film gate 12, through the rotating compensating prism 16, I provide light deflecting means, preferably a light deflecting prism 24 arranged between gate 12 and prism 16. This light deflecting prism 24 has two reflecting faces 25 and 26 which reflect the light beam 11 as indicated by the broken line 27. As clearly shown in the drawing, particularly Fig. 1, the reflecting face 26 of prism 24 directs the light beam through the compensating prism 16 and the projection lens 28.

Between light source 10 and film gate 12, I arrange besides the conventional condenser lens 29 also an equalizer member 30 having portions of different light transparency. This equalizer member is shaped and constructed in such a manner that the translucency variations of its translucent portions are in accordance with the different cyclical variations in brightness of each different portion of the images on film 13. This member 30 is rotatably supported by brackets 31 and 35 mounted on wall 32. This wall carries also the bearings for shafts 17 and 22. The gears 33, 34 and shaft 36 serve for rotating the equalizer member 36 in synchronism with the movement of the film.

The above described projector operates as follows:

The motor not shown in the drawing drives gear 23 which in turn by means of shaft 22 rotates the transporting sprocket 21. This transporting sprocket 21 engages film 13, pulling it continuously with uniform speed in direction of arrow 14. Film 13 is thus moved with uniform speed past film gate 12. Since this film also engages the prism driving sprocket 15 firmly connected with the compensating prism 16, movement of film 13 in direction of arrow 14 will also result in continuous uniform rotation of the compensating prism 16 in direction of arrow 37.

Simultaneously therewith, rotation of gear 23 will result in rotation of gears 33, 34 and shaft 36, the latter rotating the equalizing member 36.

In order to properly frame the film 13 within the aperture of the film gate 12, the adjusting roller 19 is turned until the film is in the desired position. I wish to stress that of course it is also possible to use this adjusting roller to prevent as far as possible film loops between roller 19 and film gate 12 on the one hand and roller 19 and sprocket 15 on the other hand.

Since the action and effects of compensating prisms are well-known to everybody skilled in this art, it seems unnecessary to describe in detail how by means of such a prism a steady image is obtained on the projection screen. I wish only to stress that by arranging the single elements of my projector as proposed above, I am able to obtain almost satisfactory synchronism between the film movement through film gate 12 and the rotation of prism 16. Since, however, a certain space is needed for the deflecting prism 24 and for certain technical well-known reasons it is impossible to further reduce the size of the compensating prism 16, the distance between film gate 12 and the first of the teeth 38 of the sprocket 15 is still considerable, resulting in certain lack of synchronism between film movement and prism movement and a slight unsteadiness of the projected images.

Figure 3:
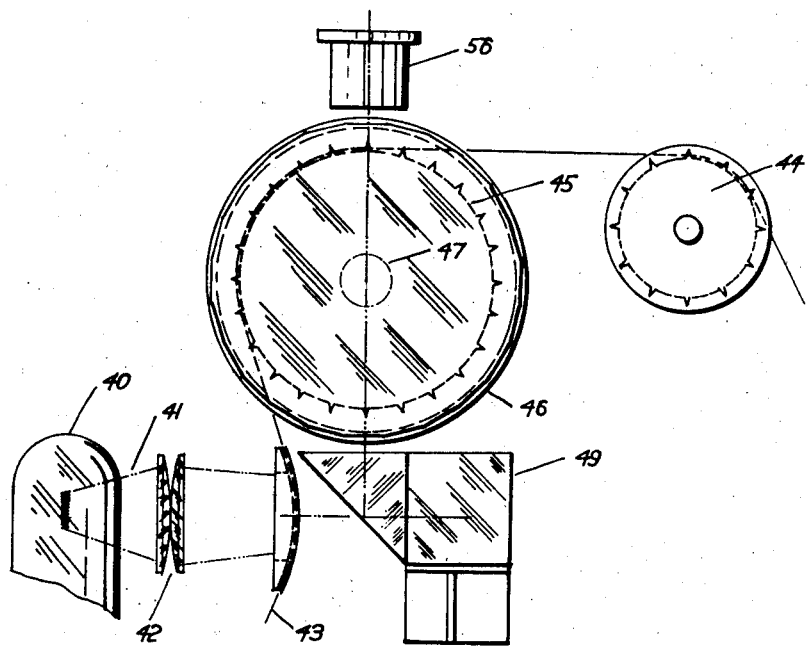
Fig. 3 is a front view of a preferred embodiment of a cinematographic projector according to my present invention provided with a Porro prism.
Figure 4:
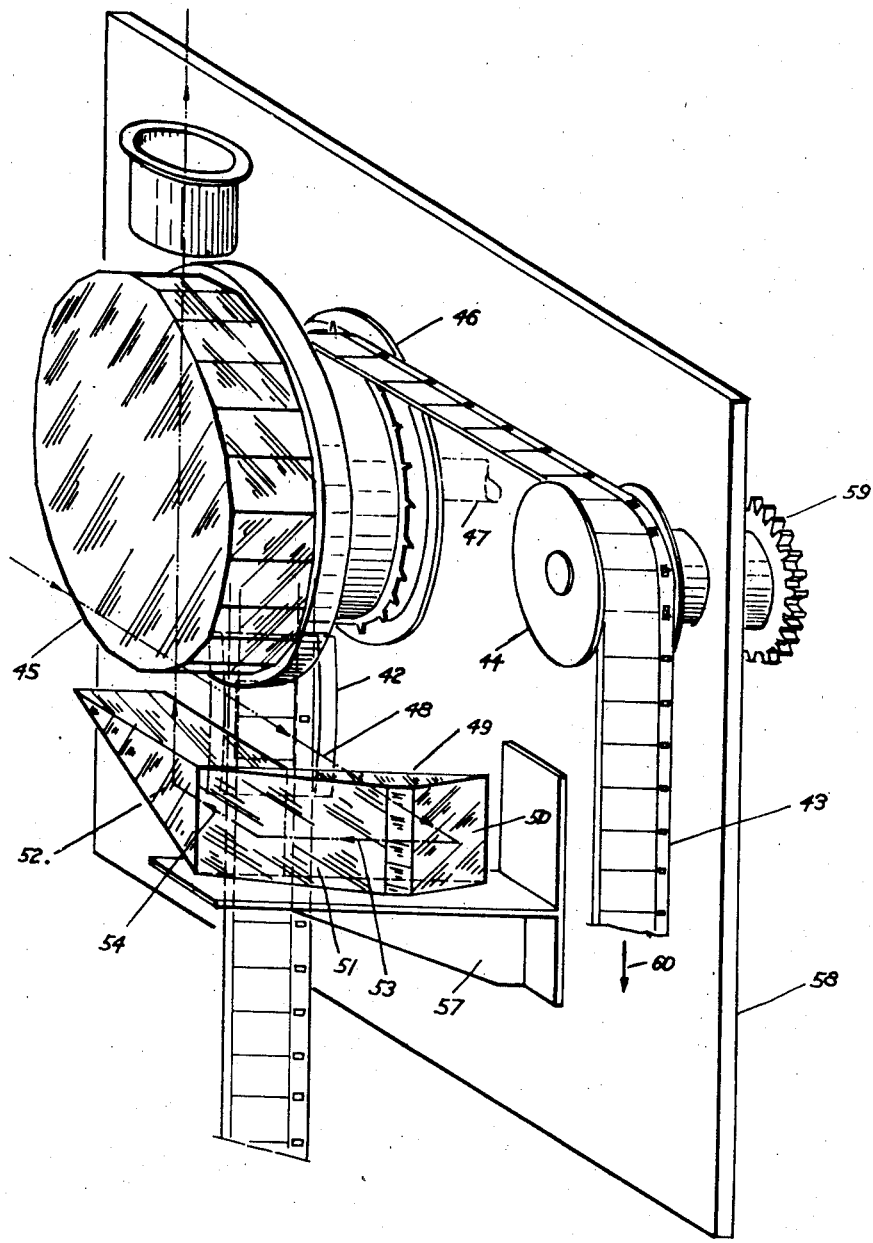
Fig. 4 is a perspective view of the cinematographic projector shown in Fig. 3.

Therefore, in order to further reduce the distance between film gate and compensating prism which causes this lack of synchronism and the unsteadiness of the projected images, I use the preferred embodiment of my new projector shown in Figs. 3 and 4. Certain elements of this projector are identical with those of the projector shown in Figs. 1 and 2 and their functions will therefore not be described in detail: thus light source 40, condenser lens 41, film gate 42, film 43 and transporting sprocket 44 are arranged substantially in the same way as in the above described embodiment and no further detailed description and explanation of the functions of the same is necessary.

There are, however, certain important constructive differences between the projector shown in Figs. 3 and 4 and the one described above and shown in Figs. 1 and 2. These differences consist mainly in different arrangement of the compensating prism and the deflecting member between this prism and the film gate: as shown, both the compensating prism 45 and the sprocket 46 driving the same are arranged on and carried by the shaft 47 which is rotatable about an axis that is not only normal to the plane of movement of film 43 but also spaced from the path of light beam 48; this is done in such a manner as to move sprocket 46 as close as possible to film gate 42.

It is evident that if the compensating prism 45 and sprocket 46 are arranged in this manner, a deflecting member of the type shown in Figs. 1 and 2 would be unsuited for directing the light beam from the film gate through the compensating prism and the projection lens. Therefore, I employ a specific type of deflecting prism member, namely a Porro prism of the second type designated in the drawing with numeral 49; a prism of this type has three reflecting faces 50, 51 and 52 directing the light beam 48 passing through gate 42 as indicated by the broken line 53. The two reflecting faces 50 and 51 of this prism deflect the light beam 48 so that the reflected light beam 54 is parallel to light beam 48, but directed in opposite direction. This reflected light beam 54 is then erected by the reflecting face 52; thus, after these three reflections, the light beam 55 is located in a plane normal to the axis of rotation of shaft 47 and is directed normal to the path of the light beam 48. This light beam 55 passes then through the compensating prism 45 and projection lens 56 as shown in Fig. 4.

The Porro prism 49 described above is supported by bracket 57 secured to the wall 58. This wall carries also the transporting sprocket 44 and the combined sprocket-prism unit consisting of driving sprocket 46 and compensating prism 45.

A projector of this type operates in the same way as the one described above in connection with Figs. 1 and 2. The only difference is that the distance between the first tooth of sprocket 46 engaging the film 43 and the film gate 42 is substantially smaller than the corresponding distance between the first tooth of sprocket 15 and film gate 12 is in the embodiment shown in Figs. 1 and 2. This results in substantially increased steadiness of the projected images so that projectors of this type are particularly well adapted for television purposes.

I wish to note that in a projector of the type shown in Figs. 3 and 4 in which no framing roller 19 of the type shown in Figs. 1 and 2 is used, it is of great importance to arrange the teeth of sprocket 46 in such a manner that in the position of the compensating prism 45 shown in Fig. 3, the center of an image on film 43 is in the center of the aperture within film gate 42, i. e., that in this position the central ray of the light beam 48 passes through the center of a film image.

Figure 5:
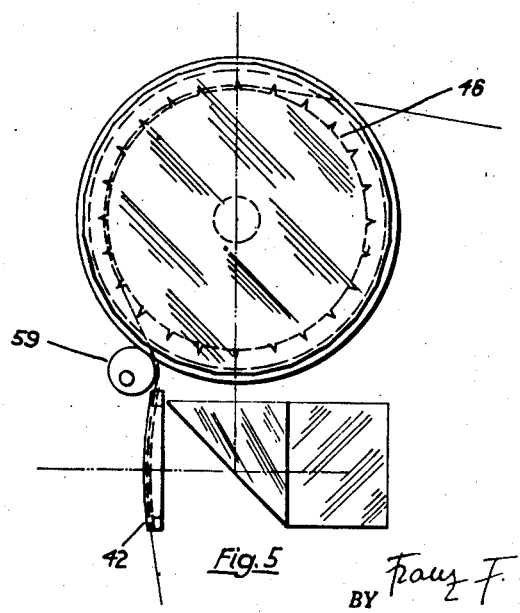
Fig. 5 is a front view of a modification of the cinematographic projector shown in Figs. 3 and 4.

The embodiment shown in Fig. 5 is substantially identical with the one shown in Figs. 3 and 4; the only difference is that between film gate 42 and sprocket 46 an adjusting roller 59 is arranged. This adjusting roller has the same functions and operates in the same way as the adjusting roller 19 shown in Figs. 1 and 2 and therefore detailed description of the same is unnecessary.

Although not specifically claimed, I wish to stress that the length of the aperture within the film gate 42 in direction of movement of the film has to be so great that at least two images on the film are simultaneously illuminated, i. e., projected through this aperture. This is necessary in order to avoid flicker along the edges of the projected images. This minimum size of the aperture in the film gate is of certain importance for the arrangement proposed by me, since it influences the minimum distance between the film gate and the prism driving sprocket.

It will be understood that each of the elements described above, or two or more together, may also find a useful application in other types of cinematographic projectors differing from the types described above.

While I have illustrated and described the invention as embodied in projectors equipped with film driven compensating prisms, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a cinematographic projector, in combination a light source emitting a projecting light beam, a film gate arranged in the path of said light beam and adapted to guide a film during movement of said film through said film gate, a sprocket arranged directly adjacent to said film gate in the plane of said movement of said film through said film gate so as to engage said film after the same has moved through said film gate without formation of any film loop between said film gate and said sprocket, a compensating prism arranged co-axially with said sprocket, means carrying both said sprocket and said compensating prism rotatably about a common axis being normal to said plane of movement of said film through said film gate and spaced from said path of said light beam passing through said film gate, first light reflecting means arranged in said path of said light beam after the same has passed through said film gate reflecting said light beam so that the thus once reflected light beam is parallel to said common axis of rotation of said sprocket and said compensating prism, second light reflecting means arranged in the path of the thus once reflected light beam and reflecting said thus once reflected light beam so that the thus obtained twice reflected light beam is parallel to the path of said light beam passing through said film gate but directed in opposite direction, third light reflecting means arranged in the path of said twice reflected light beam erecting the same about 90 degrees so that the thus obtained thrice reflected light beam passes through said compensating prism normal to said axis of rotation of said shaft means and normal to said path of said light beam passing through said film gate, film transporting means engaging said film after the same has engaged said sprocket so as to move said film with uniform speed through said film gate and rotate said sprocket engaging said film, and a projection lens arranged in said path of said light beam after the same has passed through said compensating prism.

2. In a cinematographic projector, in combination a light source emitting a projecting light beam, a film gate arranged in the path of said light beam and adapted to guide a film during movement of said film through said film gate, a sprocket arranged directly adjacent to said film gate in the plane of said movement of the film through said film gate so as to engage said film after the same has moved through said film gate without formation of any film loop between said film gate and said sprocket, a compensating prism arranged co-axially with said sprocket, shaft means carrying said sprocket and said compensating prism freely rotatably about an axis of rotation being normal to said plane of movement of said film through said film gate and spaced from said path of said light beam passing through said film gate, a Porro prism of the second type arranged in said path of said light beam after the same has passed through said film gate reflecting said light beam three times in such a manner that the thus reflected light beam passes through said compensating prism normal to said axis of rotation of said shaft means and normal to said path of said light beam passing through said film gate, film transporting means engaging said film after the same has engaged said sprocket so as to move said film with uniform speed through said film gate and rotate said sprocket engaging said film, and a projection lens arranged in said path of said light beam after the same has passed through said compensating prism.

FRANZ F. EHRENHAFT.

REFERENCES CITED

The following references are of record in the file of this patent:

UNITED STATES PATENTS

| Number | Name | Date |
| --- | --- | --- |
| 708,303 | Bianchi | Sept. 2, 1902 |
| 2,004,120 | Leventhal | June 11, 1935 |
| 2,247,295 | Heinisch | June 24, 1941 |
| 2,323,513 | Bamford | Apr. 6, 1943 |

FOREIGN PATENTS

| Number | Country | Date |
| --- | --- | --- |
| 5,268 | Great Britain | Mar. 2, 1914 |
| 289,635 | Italy | Mar. 18, 1930 |
| 319,678 | Great Britain | Sept. 26, 1929 |
| 527,956 | Great Britain | Oct. 18, 1940 |